United States Patent [19]

Naganuma et al.

[11] Patent Number: 5,223,975
[45] Date of Patent: Jun. 29, 1993

[54] POLARIZATION BEAM COUPLER INCLUDING A SPLITTER FOR PRODUCING AN OUTPUT MONITOR BEAM

[75] Inventors: Norihisa Naganuma, Yokohama; Hisashi Takamatsu, Kawasaki; Kenichi Abe, Yamato, all of Japan

[73] Assignee: Fujitsu Limited, Kawasaki, Japan

[21] Appl. No.: 431,240

[22] Filed: Nov. 3, 1989

[30] Foreign Application Priority Data

Nov. 11, 1988 [JP] Japan .................. 63-283814
Nov. 11, 1988 [JP] Japan .................. 63-283815
Sep. 7, 1989 [JP] Japan .................. 1-230453

[51] Int. Cl.⁵ .......................... G02B 5/30; G02B 27/28
[52] U.S. Cl. ................................. 359/487; 359/495; 359/497; 359/122; 385/11; 385/36
[58] Field of Search ............... 350/370, 400, 401, 403, 350/394, 397; 370/1, 2; 359/490, 494, 495, 496, 497, 498, 122, 484, 485, 487, 499, 833; 385/11, 36

[56] References Cited

U.S. PATENT DOCUMENTS

| | | | |
|---|---|---|---|
| 1,304,517 | 5/1919 | Twyman et al. | 359/638 |
| 3,584,221 | 6/1971 | Furukawa | 35/497 |
| 4,272,159 | 6/1981 | Matsumoto | 350/401 |
| 4,392,722 | 7/1983 | Shirasaki | 350/375 |
| 4,671,613 | 6/1987 | Buhrer | 350/401 |
| 4,800,556 | 1/1989 | Charlier et al. | 350/401 |

FOREIGN PATENT DOCUMENTS

| | | | |
|---|---|---|---|
| 0271641 | 6/1988 | European Pat. Off. | 350/401 |
| 0103518 | 8/1980 | Japan | 350/401 |
| 0137327 | 10/1981 | Japan | 350/394 |
| 0048018 | 3/1983 | Japan | 350/394 |
| 0249818 | 10/1988 | Japan | 370/2 |
| WO85/01590 | 4/1985 | PCT Int'l Appl. | |
| 2076994 | 12/1981 | United Kingdom | 350/394 |
| 2158962 | 1/1985 | United Kingdom | |

OTHER PUBLICATIONS

IBM Technical Disclosure Bulletin, vol. 15, No. 4, Sep. 1982, pp. 1399–1400; J. J. Wynne: "Light Beam Combiner", *Whole document*.

Patent Abstracts of Japan, vol. 9, No. 327 (P-415)[2050], Dec. 21, 1985; & JP-A-60 151 610, (Canon K. K.), Aug. 9, 1985.

Primary Examiner—Bruce Y. Arnold
Assistant Examiner—R. D. Shafer
Attorney, Agent, or Firm—Staas & Halsey

[57] ABSTRACT

A polarization beam coupler adapted to produce an output light beam for monitoring is disclosed. The polarization beam coupler includes a polarization beam coupling cube for coupling two incident light beams having polarization planes perpendicular to each other and projecting the coupled light beams on the same optic axis, a beam splitting cube having a beam splitting film formed from a dielectric multi-layer or single-layer film for extracting a monitor beam, and a quarter-wave plate interposed between the polarization beam coupling cube and the beam splitting cube such that incident light beams to the beam splitting cube may be circularly polarized light. Due to the construction, the output level of a monitor light beam can be prevented from depending upon the polarization planes of the incident light.

11 Claims, 12 Drawing Sheets

POLARIZATION BEAM COUPLER INCLUDING A SPLITTER FOR PRODUCING AN OUTPUT MONITOR BEAM

BACKGROUND OF THE INVENTION

This invention relates to a polarized beam coupler for coupling two light beams having polarization planes that are perpendicular to each other, and more particularly to the polarized beam coupler suitable for producing an output beam to be monitored.

In the past, dual light sources have been used in an attempt to construct a highly reliable optical fiber communications system. In such system the two light sources are constructed such that the two emergent light beams may be coupled to an optical transmission line. At an initial stage of operation of the system, only one of the light sources is used. If the initial stage light source should fail, the other light source is used to prevent a system shut down which would otherwise take place. A polarized beam coupler is used in a highly reliable system of this type to couple the emergent light beams from two light sources to a common optical transmission line. In such systems it is necessary to split a part of the emergent light beam to monitor the same in order to supervise, for example, age deterioration of the light source. Accordingly, a polarized beam splitter is demanded which produces an emergent light beam which can be well monitored.

FIG. 1 is a schematic illustration showing the general construction of a conventional polarized beam coupler. Referring to FIG. 1, the polarized beam coupler includes a polarized beam coupling cube 11 having a polarized beam coupling film 11a formed from a dielectric multi-layer film or the like. By using a cube of such construction, two incident light beams having polarization planes that are perpendicular to each other can be projected on the same optical axis. In the device of FIG. 1, a P wave from a first input port has a polarization plane which is an oscillation plane of an electric field vector and which is parallel to the plane of incidence of the polarized beam coupling film 11a so that the P wave passes through the polarization beam coupling film 11a. On the other hand, an S wave from a second input port has a polarization plane which is perpendicular to the plane of incidence of the polarized beam coupling film 11a so that the S wave is reflected by the polarized beam coupling film 11a, and thus the transmitted light and the reflected light emerge on the same optical axis.

The polarized beam coupler further includes a beam splitting cube 12 for extracting a monitor beam from one of the beams emerging from the polarized beam coupling cube 11 on the same optical axis. The beam splitting cube 12 normally includes a beam splitting film 12a formed from alternating layers of metal and $SiO_2$ in order to suppress the polarization plane dependency. The light beams which are incident upon the beam splitting cube 12 and which pass through the beam splitting film 12a are introduced into an optical transmission line from an output port for a signal beam. However, the portion of the light beams incident upon the beam splitting cube 12 and which are reflected by the beam splitting film 12a are introduced into a suitable photo-detector from a monitor beam output port so that the same may be used for monitoring the output beam level, feedback control and so forth.

When the beam splitting film 12a includes a metal film, the absorption loss at the beam splitting film 12a may be so great that, when a monitor beam of a predetermined level is extracted, the level of the signal beam coupled to an optical transmission line is diminished. In consideration of this problem, it may seem recommendable to employ, for such beam splitting film 12a, a dielectric multi-layer film composed of alternating layers of $Al_2O_3$ and $TiO_2$. In such case, however, distinct from the case wherein the beam splitting film includes a metal film, the polarization dependency of the transmitting power of the beam splitting film 12a is extremely high at an angle of 45 degrees, an angle which is otherwise advantageous as an angle of incidence to the beam splitting film 12a in constructing an optical device as shown in FIG. 2. Accordingly, where a dielectric multi-layer film is employed as the beam splitting film, a construction as shown in FIG. 3 has been adopted.

To reduce the polarization dependency of the transmitting power of the beam splitting film, the conventional device of FIG. 3 employs a beam splitting prism 13 wherein the angle of incidence to the beam splitting film 13a may be as small as 10 degrees or so. Thus, a monitor beam reflected by and extracted from the beam splitting film 13a is further reflected by a total reflection face 13b of the beam splitting prism 13 in order to direct the monitor beam to the outside of the prism. The reason why the total reflection face 13b is used to reflect the monitor beam in this manner is that the monitor beam is introduced into the beam splitting film 13a at an angle which is nearly a right angle and if it is not reflected away by the total reflection face 13b, then the beam reflected by the beam splitting film 13a will be intercepted by the polarized beam coupling cube 11a so that it cannot be monitored by a photo-director. Accordingly, a conventional device having such a construction as described above has problems in that the structure of the beam splitting prism is complicated and cumbersome adjustment of the optical axis is required.

As described hereinabove, where a beam splitting film is formed from a dielectric multi-layer film, it is commonly used at an angular disposition where it does not have a polarization dependency. In a conventional device of such construction, the amount of light in a monitor beam extracted from an incident light beam from a first input port and the amount of the light in a monitor beam extracted from an incident light beam from a second input port present a ratio of about 1:1, and it is difficult to change the ratio to an arbitrary value.

SUMMARY OF THE INVENTION

Accordingly, it is an object of the present invention to provide a polarized beam coupler having a simplified construction wherein absorption losses are low and the output level of a monitor beam does not depend upon the polarization plane of an incident light beam.

It is another object of the present invention to provide a polarized beam coupler wherein the ratio of the amount of light in a monitor beam extracted from an incident light beam and the amount of light in another monitor beam extracted from another incident light beam can be changed arbitrarily.

According to an aspect of the present invention, there is provided a polarized beam coupler adapted to produce an output beam for monitoring, which comprises a polarized beam coupling means for coupling two incident light beams having planes of polarization that are perpendicular to each other and projecting the coupled light beams on the same optical axis, a beam splitting means disposed on the optical axis of the polarized beam coupling means for extracting a monitor beam, the beam splitting means having a beam splitting film formed from a dielectric film, and a quarter-wave plate interposed between the polarized beam coupling means and the beam splitting means such that the light beams incident on the beam splitting means may be circularly polarized light.

The polarized beam coupling means may be constructed either from a polarized beam coupling cube which is composed of two triangular prisms adhered to each other and a polarized beam coupling film interposed on the interface between the prisms, or from a polarized beam coupling prism unit which is composed of a parallelogram prism, a triangular prism adhered to the parallelogram prism and a polarized beam coupling film interposed on the interface between the prisms. The beam splitting means may be constructed either from a beam splitting cube composed of two triangular prisms adhered to each other and a beam splitting film interposed on the interface between the prisms or from a beam splitting prism unit which is composed of a parallelogram prism, a triangular prism adhered to the parallelogram prism and a beam splitting film interposed on the interface between the prisms.

According to another aspect of the present invention, there is provided a polarized beam coupler adapted to produce an output beam for monitoring, which comprises a polarized beam coupling means for coupling two incident light beams having planes of polarization that are perpendicular to each other and projecting the coupled light beams on the same optical axis, a beam splitting means disposed on the optical axis of the polarized beam coupling means for extracting a monitor beam, the beam splitting means including a beam splitting film formed from a dielectric film and having a polarization dependency, and a polarization plane rotating means disposed between the polarized beam coupling means and the beam splitting means.

The polarization plane rotating means may be formed either from a Faraday rotator or from a rotatable half-wave plate.

According to a further aspect of the invention, there is provided a polarized beam coupler adapted to produce an output beam for monitoring which includes a polarized beam coupling means for coupling two incident light beams having planes of polarization that are perpendicular to each other and projecting the coupled light beams on the same optical axis, and a beam splitting means disposed on the optical axis of the polarized beam coupling means for extracting a monitor beam, the beam splitting means including a beam splitting film, the polarized beam coupler being characterized in that the beam splitting film is formed from a dielectric film, and in that beam splitting means is disposed such that the plane of incidence to the beam splitting film is at an angle of 45 degrees with respect to the polarization planes of the two incident light beams.

The above and other objects, features and advantages of the present invention and the manner of realizing them will become more apparent, and the invention itself will be best understood, from a study of the following description and appended claims, with reference to the attached drawings which show some preferred embodiments of the invention.

DESCRIPTION OF THE PREFERRED EMBODIMENTS

The principles of construction according to one aspect of the present invention will be described with reference to FIG. 4.

Figure 1:
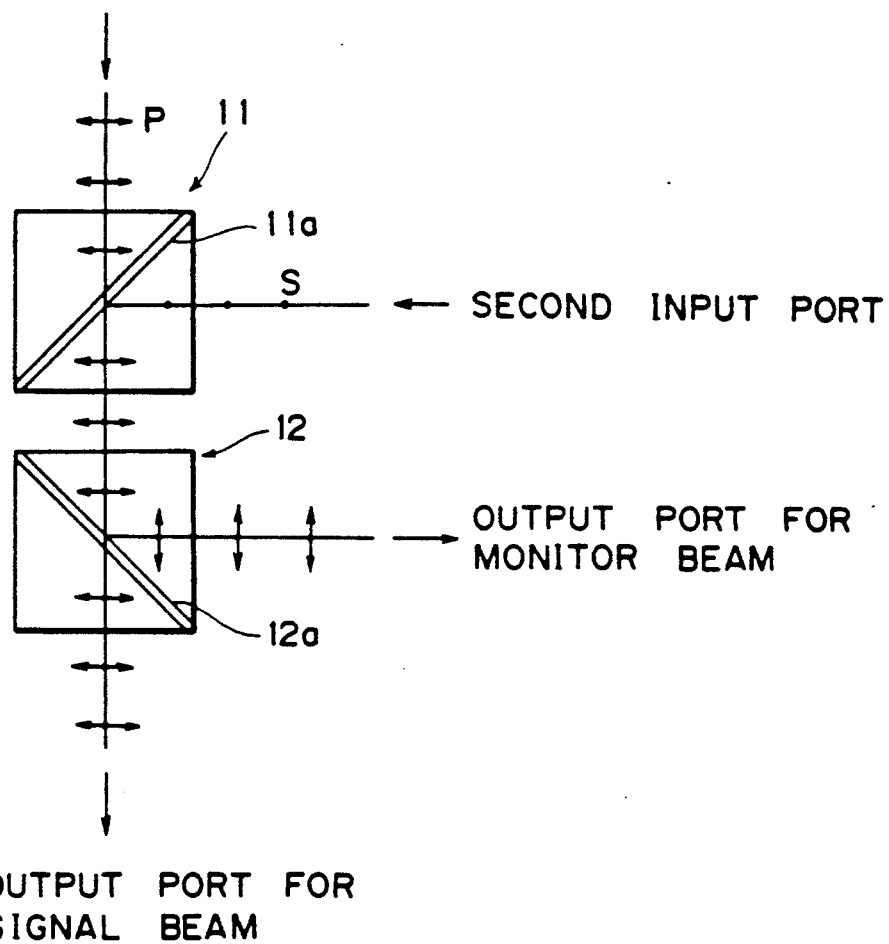
FIG. 1 is a schematic illustration showing the general construction of a conventional polarized beam coupler.
Figure 2:
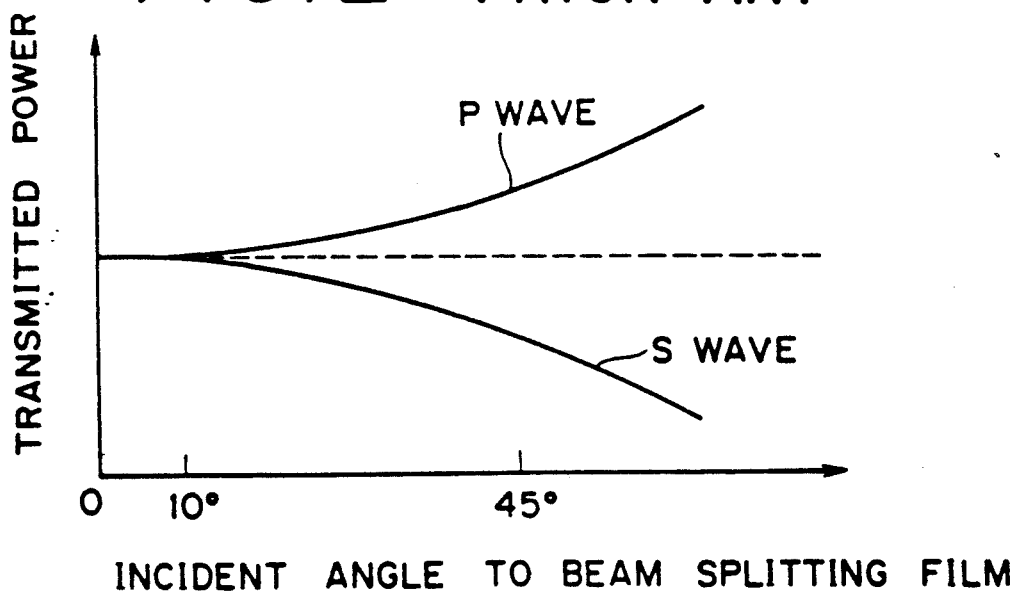
FIG. 2 is a graph illustrating the polarization dependency of a beam splitting film.
Figure 3:
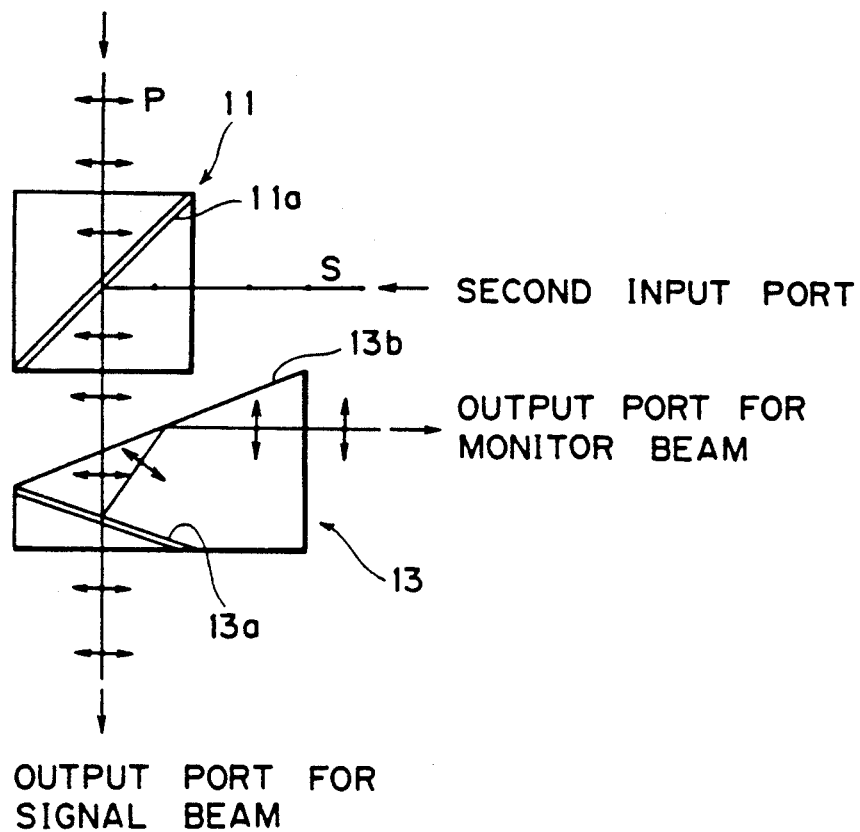
FIG. 3 is a schematic illustration showing the general construction of another conventional polarization beam coupler.
Figure 4:
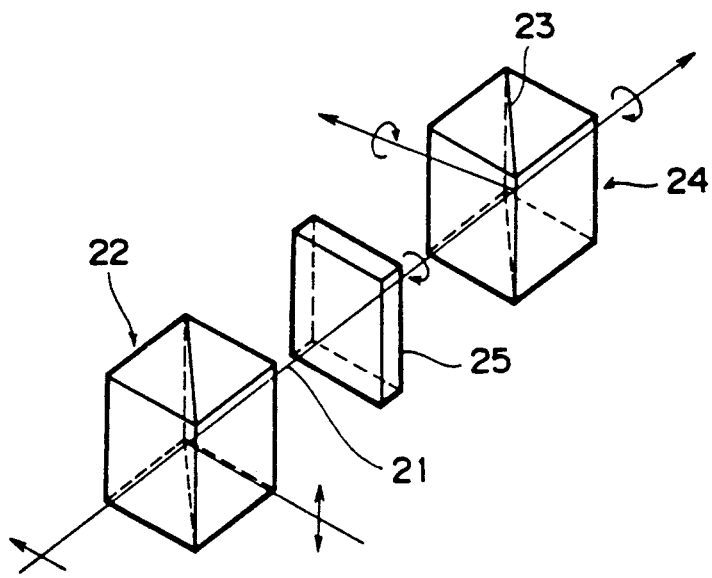
FIG. 4 is a schematic view illustrating the principles of one aspect of the present invention.

The polarized beam coupler of FIG. 4 includes a polarized beam coupling cube 22 for coupling two incident light beams having polarization planes that are perpendicular to each other and projecting them on the same optical axis 21. The polarized beam coupler further includes a beam splitting cube 24 disposed on the optical axis 21 of the polarized beam coupling cube 22 for extracting a monitor light beam therefrom. The beam splitting cube 24 includes a beam splitting film 23 formed from a dielectric multi-layer or single-layer film. A quarter-wave plate 25 is interposed between the polarized beam coupling cube 22 and the beam splitting cube 24. Thus, the beams emerging from the polarized beam coupling cube 22 are converted into circularly polarized light by the quarter-wave plate 25 and the same are then introduced into the beam splitting cube 24.

The polarized beam coupler of the present invention having such a construction as described above is characterized in that light emerging from the polarized beam coupling cube 22 is changed into circularly polarized light by the quarter-wave plate 25 and is then introduced into the beam splitting cube 24 so that the transmitting power or the reflecting power of the beam splitting film 23 is free from polarization dependency.

Figure 5:
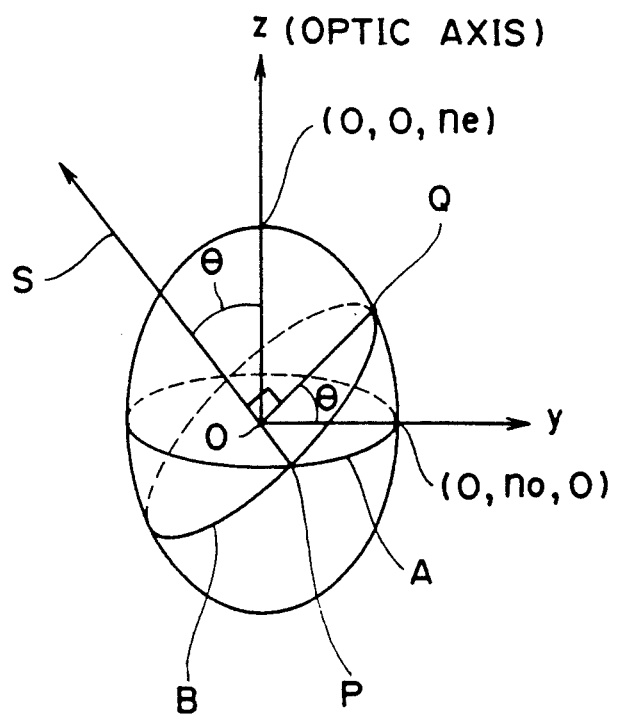
FIG. 5 is a diagrammatic representation showing an index ellipsoid wherein a birefringent crystal constituting a quarter-wave plate is composed of a positive uniaxial crystal.

The function of the quarter-wave plate 25 which is one of the components of the polarized beam coupler of the present invention described just above is described with reference to FIG. 5. It is assumed for convenience here that a birefringent crystal which constitutes the quarter-wave plate 25 is composed of a positive uniaxial crystal. The refractive index of the quarter-wave plate 25 with respect to an ordinary beam is represented by $n_o$, and the maximum value of the refractive index with respect to an extraordinary beam is represented by $n_e$ ($n_o < n_e$). Further, it is assumed that light is propagated in the direction indicated by the arrow mark S from the origin O of a rectangular three-dimensional coordinate system wherein the optical axis of the quarter-wave plate 25 is the z-axis, and a projection of the arrow mark S on the xy plate coincides with the y-axis.

In this instance, the index ellipsoid is represented by the expression $$x^2/n_o^2 + y^2/n_o^2 + z^2/n_e^2 = 1$$

The refractive index with respect to an ordinary beam is constant and is represented by a distance OP from the origin O to the point P at which a circle A formed by cutting the index ellipsoid along the xy plane and an ellipse B formed by cutting the index ellipsoid along a plane perpendicular to the propagating direction S at the origin O intersect with each other. On the other hand, the refractive index $n_e'$ with respect to an extraordinary beam varies in accordance with the angle $\theta$ provided by and between the propagating direction S and the z-axis and is represented by a distance OQ from the origin O to a point Q at which the ellipse B and the yz plane intersect with each other. In short, the refractive index $n_e'$ with respect to an extraordinary beam varies continuously from $n_o$ to $n_e$ in accordance with the propagating direction S of light.

Since the refractive index with respect to an extraordinary beam varies in accordance with the propagating direction S of light in this manner, beams incident to the beam splitting cube 24 can be converted into circularly polarized light by disposing the quarter-wave plate 25 in the following manner. Firstly, the optical axis of the quarter-wave plate 25 formed from a birefringent crystal is set such that the propagating direction S coincides with the y-axis ($\theta = 90$ degrees) in order to maximize the difference between the refractive index with respect to an ordinary beam and the refractive index with respect to an extraordinary beam. Subsequently, the optical axis of the quarter-wave plate 25 is re-set such that the polarization planes of two emergent beams from the polarized beam coupling cube 22 which are perpendicular to each other may be inclined at an angle of 45 degrees with respect to the polarization direction OP of an ordinary beam and the polarization direction OQ of an extraordinary beam in order to cause the magnitudes of the ordinary beam component and the extraordinary beam component to be equal to each other. Where the optical axis is set in this manner, light beams incident on the beam splitting cube 24 can be converted into circularly polarized light.

In this instance, if the light beams incident on the quarter-wave plate 25 are not linearly polarized light, they cannot be converted into perfectly circularly polarized light. While polarized beams incident on the polarized beam coupling cube 22 are in fact somewhat elliptically polarized light, after passing through the polarized beam coupling film, they have become linearly polarized light having a high polarization extinction ratio (20 dB or more). Therefore, according to the construction described above, circularly polarized light can be introduced into the beam splitting cube 24 irrespective of the polarization conditions of the polarized beams before they are introduced into the polarized beam coupling cube 22.

When beams incident to the beam splitting cube 24 are converted into circularly polarized light, since the P wave component and the S wave component incident on the beam splitting film 23 have equal magnitudes, even though there is a difference in phase, and even if the angle of incidence on the beam splitting film 23 is 45 degrees or so, there is no possibility that polarization dependency will occur in the transmitting power or the reflecting power of the film 23. Accordingly, it is not necessary to employ a complicated construction for the beam splitting cube 24. A dielectric multi-layer or single-layer film is employed for the beam splitting film 23 of the beam splitting cube 24 of the present invention because it is intended to reduce the absorption losses which would occur if a metal beam splitting film is used.

Figure 6:
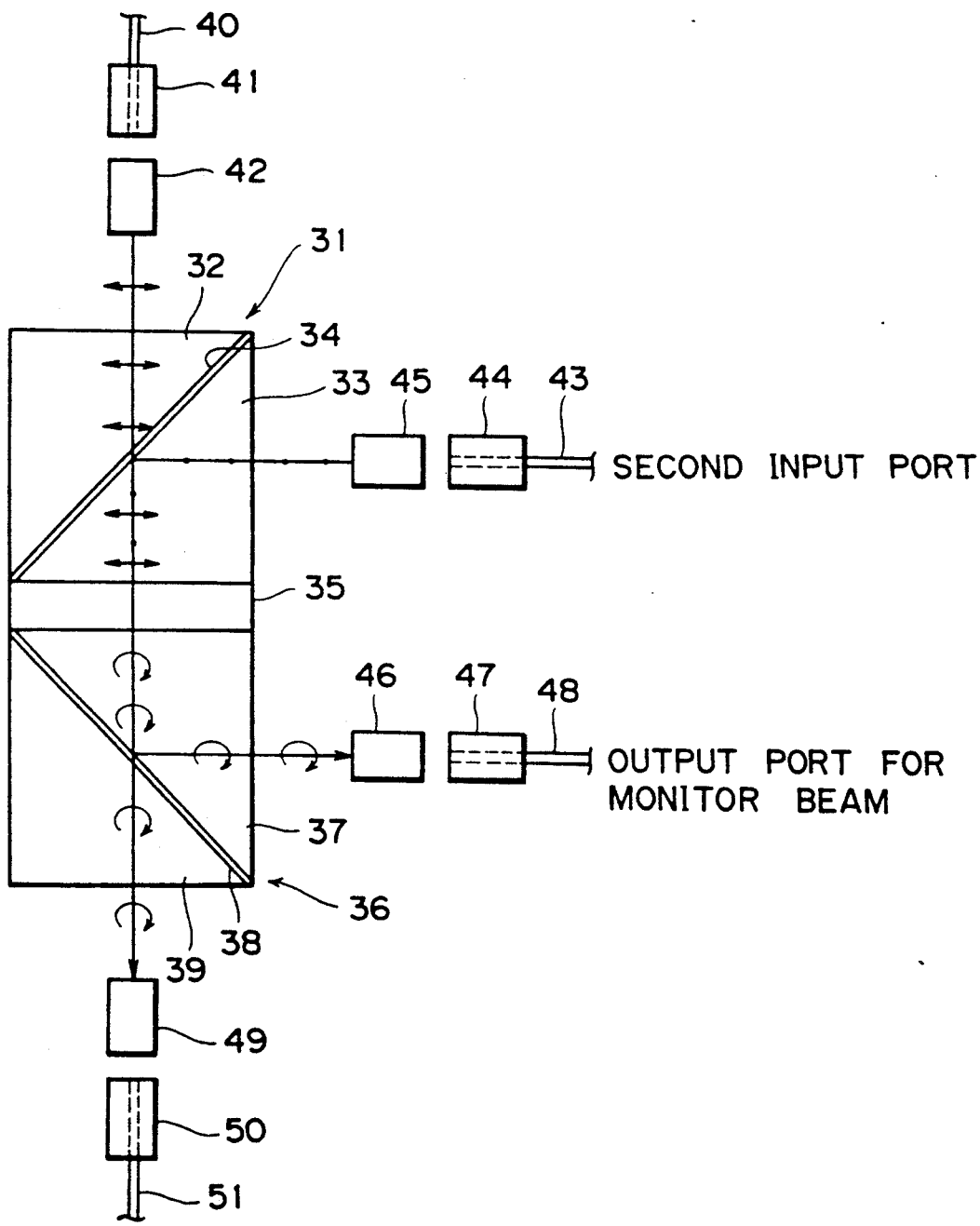
FIG. 6 is a plane view of a polarized beam coupler according to a first embodiment of the present invention.

Referring now to FIG. 6, there is shown a first embodiment of the present invention constructed in accordance with the principles described above. In this case the polarized beam coupler includes a polarized beam coupling cube 31 which is composed of two triangular prisms 32 and 33 and a polarized beam coupling film 34 formed from a dielectric multi-layer or single-layer film and interposed between the inclined faces of the triangular prisms 32 and 33. The polarized beam coupler further includes a quarter-wave plate 35 formed from a birefringent crystal having a predetermined thickness, and a beam splitting cube 36 composed of two triangular prisms 37 and 39 and a beam splitting film 38 formed from a dielectric multi-layer or single-layer film and interposed between inclined faces of the two triangular prisms 37 and 39. The polarized beam coupling cube 31, quarter-wave plate 35 and beam splitting cube 36 are secured to each other using an optical bonding agent to unite them together to present a unitary member.

A first input port is constituted such that the light emerging from a polarization preserving optical fiber 40 securely inserted in a ferrule 41 may be substantially collimated by a GRIN rod lens 42. Light emerging from the GRIN rod lens 42 is introduced at an angle of incidence of, for example, 45 degrees into the polarized beam coupling film 34 and has a polarization plane that is parallel to the plane of incidence. A second input port is constituted such that the light emerging from another polarization preserving optical fiber 43 securely inserted in another ferrule 44 may be substantially collimated by another GRIN rod lens 45. The light emerging from the GRIN rod lens 45 is introduced at an angle of incidence of, for example, 45 degrees into the polarization beam coupling film 34 and has a polarization plane perpendicular to the plane of incidence. Further, the optical path of light from the second input port which is reflected by the polarized beam coupling film 34 coincides with the optical path of light from the first input port which is transmitted through film 34.

Quarter-wave plate 35 is formed from a birefringent crystal and the optical axis thereof is set such that the polarization planes of two incident beams thereto may make an angle of 45 degrees with respect to the polarization planes of light beams which are ordinary and extraordinary with respect to the birefringent crystal. Consequently, two linearly polarized light beams introduced on the same optical axis into the quarter-wave plate 35 are individually converted into circularly polarized light. As a result, even where a dielectric multilayer or single-layer film is employed as the beam splitting film 38 of the beam splitting cube 36 as in the present embodiment, the angle of incidence to the beam splitting film 38 can be 45 degrees or so because the splitting ratio does not depend on the polarization directions.

Circularly polarized light passes through the beam splitting film 38 and emerging from the beam splitting cube 36 is focused by a GRIN rod lens 49 and coupled to an optical fiber 51 securely inserted in a ferrule 50. Meanwhile, circularly polarized light reflected by the beam splitting film 38 and emerging from the beam splitting cube 36 is focused by another GRIN rod lens 46 and coupled to an optical fiber 48 securely inserted in another ferrule 47. A light beam introduced into the optical fiber 51 can be sent out as a main signal into an optical transmission line while the light beam introduced into the optical fiber 48 can be used as a monitor beam for supervision of age deterioration or the like of a laser diode used as the light source.

Figure 7:
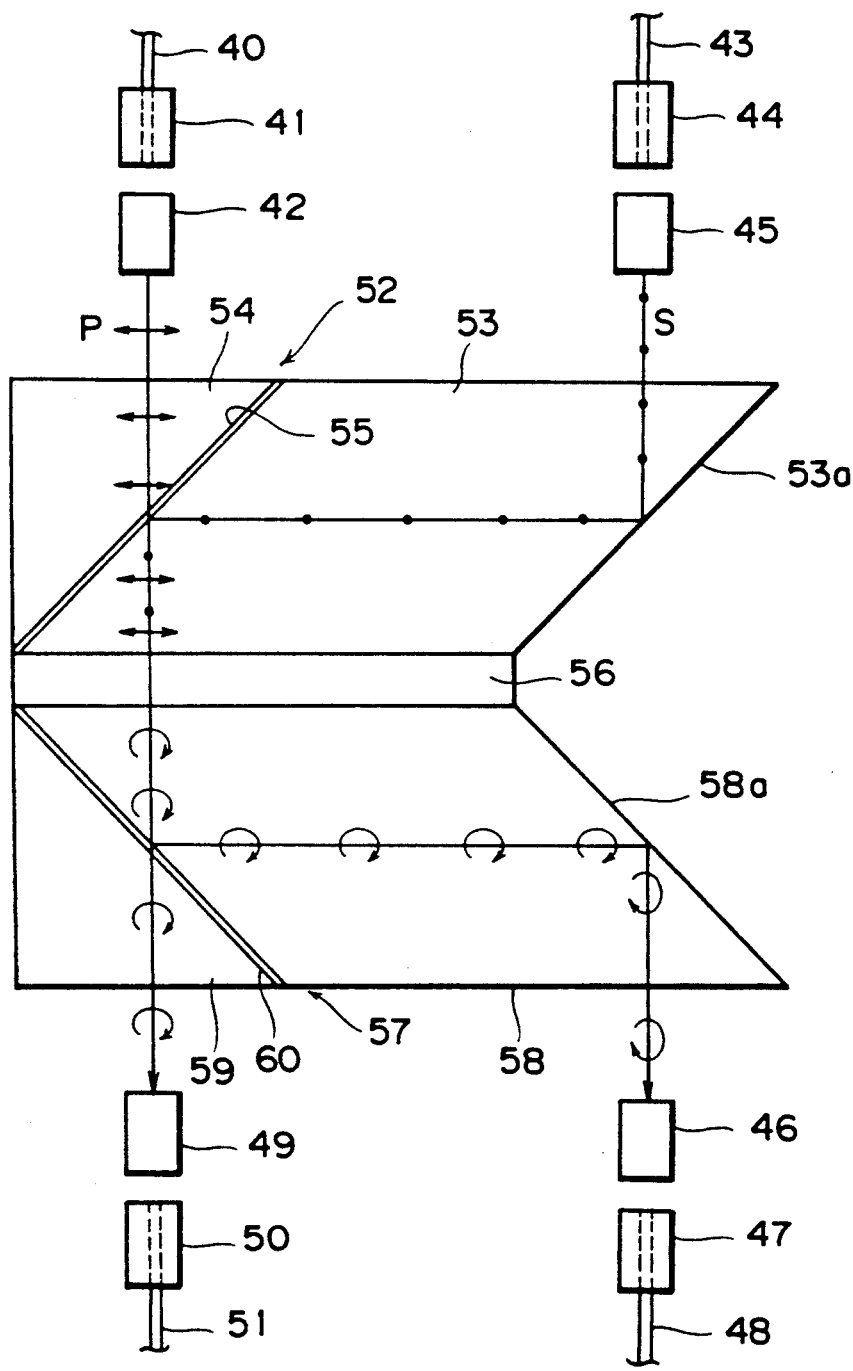
FIG. 7 is a plan view of a polarized beam coupler according to a second embodiment of the present invention.

FIG. 7, is a plan view of a polarized beam coupler according to a second embodiment of the present invention. It is to be noted that parts of the second embodiment shown in FIG. 7 which are substantially the same as those of the first embodiment described above are denoted by like reference numerals and description thereof is partially omitted herein to avoid redundancy. In the embodiment of FIG. 7, a polarized beam coupling prism unit 52 and a beam splitting prism unit 57 are employed in place of the polarized beam coupling cube 31 and the beam splitting cube 36, respectively, of the first embodiment described above. The polarized beam coupling prism unit 52 is composed of a parallelogram prism 53, a triangular prism 54 adhered to the parallelogram prism 53, and a polarized beam coupling film 55 interposed on the interface between the prisms 53 and 54. Similarly, the beam splitting prism unit 57 is composed of a parallelogram prism 58, a triangular prism 59 adhered to the parallelogram prism 58, and a beam splitting film 60 formed from a dielectric multi-layer or single-layer film that is interposed on the interface between the parallelogram prism 58 and the triangular prism 59.

Figure 8:
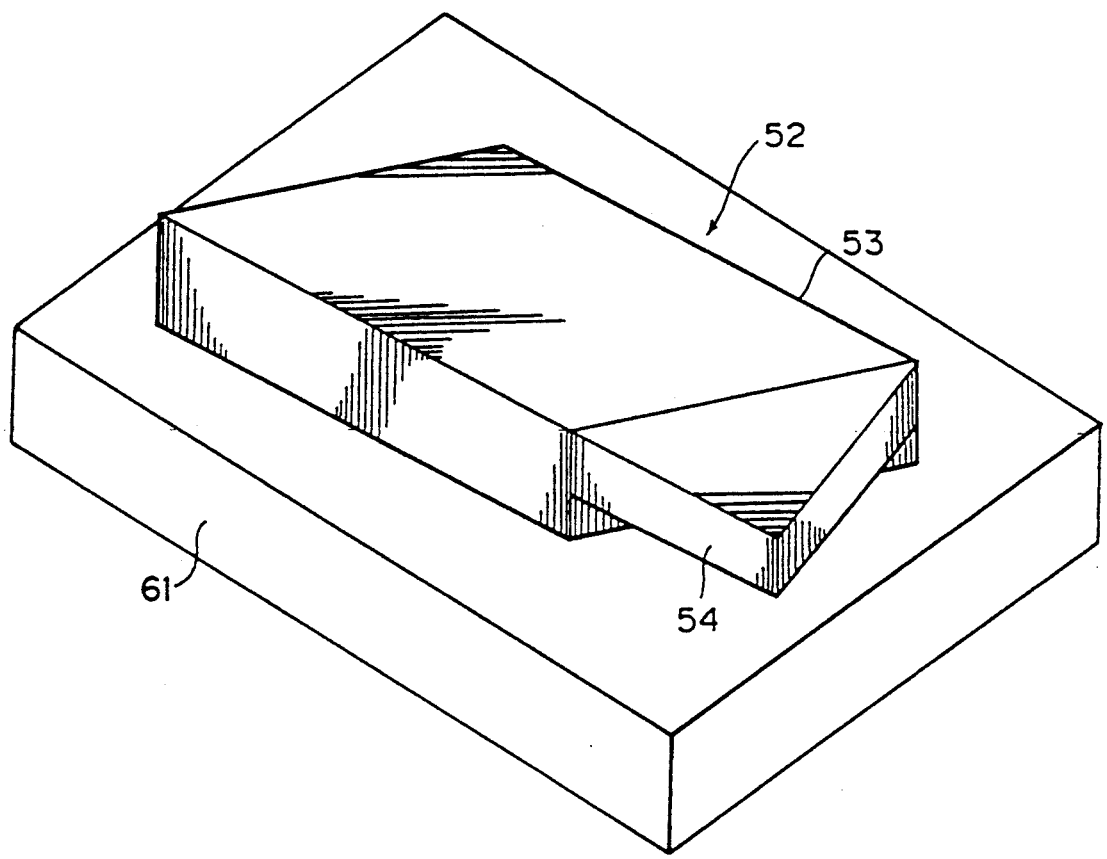
FIG. 8 is a perspective view of a polarized beam coupling prism unit of the polarized beam coupler of FIG. 7.

As shown in FIG. 8, the polarized beam coupling unit 52 is constituted such that the parallelogram prism 53 is adhered to a base 61 while the triangular prism 54 is secured to a side face of the parallelogram prism 53 in a spaced relationship relative to base 61. Due to such construction, the difference in displacement between individual parts resulting from thermal expansion or the like which may be forecast in situations where the parallelogram prism 53 and the triangular prism 54 are otherwise adhered to the base 61 independently of each other, can be absorbed effectively, and exfoliation of the adhered faces of the parallelogram prism 53 and the triangular prism 54 which may arise from such possible differences in displacement between the various parts can be prevented effectively. The beam splitting prism unit 57 is constructed in a similar manner, and possible exfoliation at the adhered faces of the parallelogram prism 58 and the triangular prism 59 is prevented effectively.

Referring back to FIG. 7, a quarter-wave plate 56 is sandwiched between and adhered to the polarized beam coupling prism unit 52 and the beam splitting prism unit 57 by means of an optical bonding agent to integrate them as a unitary member. As an alternative, the quarter-wave plate 56 may be adhered to a side face of the polarized beam coupling prism unit 52 or else to a side face of the beam splitting prism unit 57.

Since the polarized beam coupler of the present embodiment has such a construction as described above, the light beam from the second input port can be introduced in parallel to the light beam from the first input port, and the direction of an extracted monitor beam is parallel to the direction of transmission of the signal beam. A polarized beam introduced by way of the second input port is totally reflected by an inclined face 53a of the parallelogram prism 53 and is then introduced to the polarized beam coupling film 55. On the other hand, circularly polarized light reflected by the beam splitting film 60 is totally reflected by an inclined face 58a of the parallelogram prism 58 and coupled to an output port for use as a monitor beam.

Figure 9:
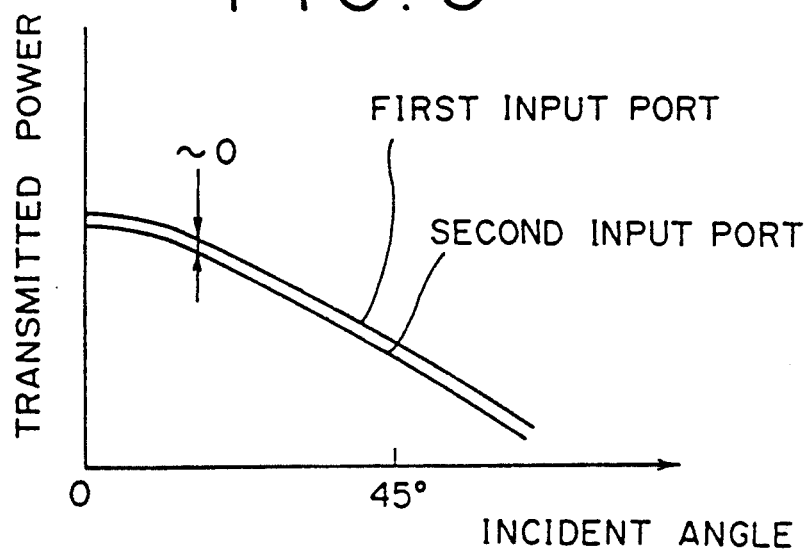
FIG. 9 is a graph showing the relationship between transmitted power and the angle of incidence to the beam splitting film in the polarized beam couplers shown in FIGS. 6 and 7.

FIG. 9 provides an illustration of the relationship between the transmission powers of and the angles of incidence to the beam splitting films 38 and 60 in the first and second embodiments described hereinabove. It is to be noted that sufficient transmission power can be obtained for a light beam from the first input port and another light beam from the second input port where the angle of incidence is 45 degrees, and there is little difference between the transmitted powers of both beams. Accordingly, there is no necessity for setting the angle of incidence to the beam splitting film at a small angle of 10 degrees or so as in a conventional device, and accordingly the constructions of the beam splitting cube 36 and the beam splitting prism unit 57 can be simplified.

Figure 10:
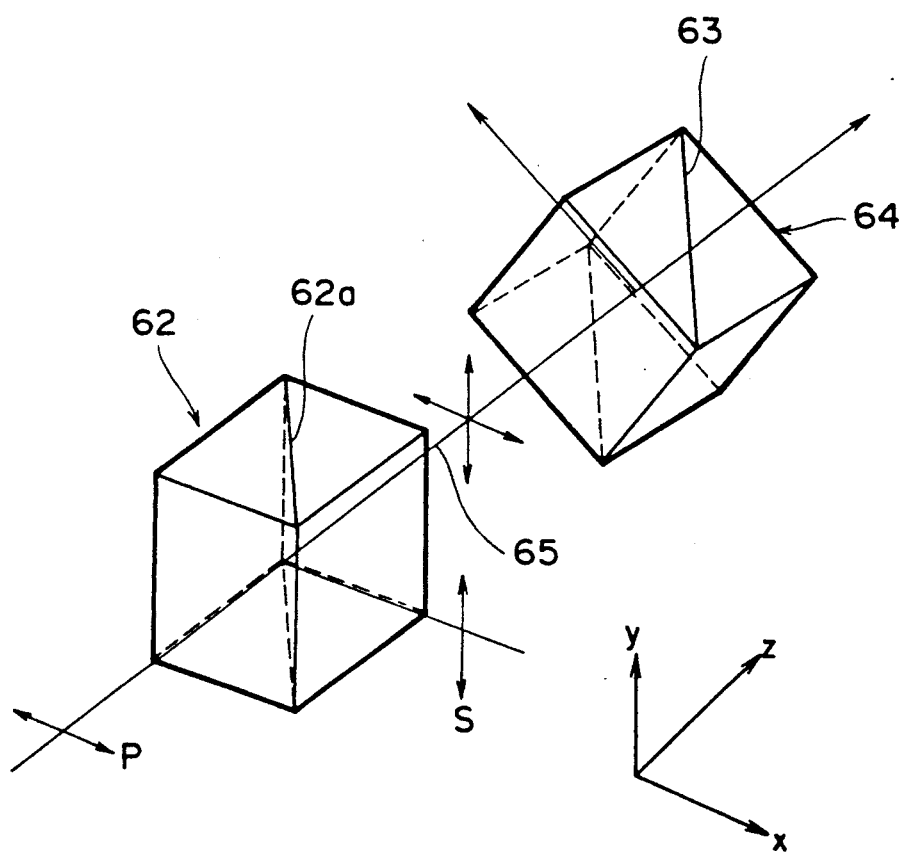
FIG. 10 is a view similar to FIG. 4 but illustratively showing the principles of another aspect of the present invention.

The principles of construction according to another aspect of the present invention will be described with reference to FIG. 10. The polarized beam coupler shown in FIG. 10 includes a polarized beam coupling cube 62 having a polarized beam coupling film 62a therein. The polarized beam coupling cube 62 couples two incident light beams having polarization planes that are perpendicular to each other and projects them on the same optical axis 65. The polarized beam coupler further includes a beam splitting cube 64 disposed on the optical axis 65 of the polarized beam coupling cube 62 for extracting a monitor beam. The beam splitting cube 64 includes therein a beam splitting film 63 formed from a dielectric multi-layer or single-layer film. The beam splitting film 64 is disposed such that the plane of incidence to the beam splitting film 63 is at an angle of 45 degrees with respect to the polarization planes of the two incident beams.

A rectangular three-dimensional coordinate system (x, y, z) is considered wherein the angles of incidence to the polarized beam coupling film 62a of two incident beams of light to the polarized beam coupling cube 62 which have mutually perpendicular polarization planes may coincide with the xz plane, and it is assumed that one of the incident light beams which passes through the polarized beam coupling film 62a is a P wave having a polarization plane parallel to the xz plane while the other incident light beam which is reflected by the polarized beam coupling film 62a is an S wave having a polarization plane parallel to the xy plane. It is to be noted that the P wave and the S wave mentioned here denote a P wave and an S wave with respect to the polarized beam coupling film 62a, respectively. Since the polarized beam coupling cube 62 has a single optical axis for emergent light, if it is assumed here that the optical axis is parallel to the z-axis, then the polarization plane of the emergent light beam is parallel to the xz plane and also to the yz plane. Here, the plane of incidence to the beam splitting film 63 of the beam splitting cube 64 will be examined. In the construction of the present invention the plane of incidence is at an angle of 45 degrees with respect to the polarization planes of the two incident light beams and therefore the plane of incidence is at an angle of 45 degrees with respect to the xz plane and also to the yz plane. In other words, the plane of incidence to the beam splitting film 63 is parallel to a plane of y=x and also to a plane of y=−x. Consequently, since both polarized components of the light incident to the beam splitting film 63 are reflected or transmitted as a respective P wave or S wave (with respect to the beam splitting film 63) of the same magnitude, neither the reflected light level or the transmitted light level from the beam splitting film 63 is dependent upon the polarization plane of the incident light beam. Accordingly, the angle of incidence to the beam splitting film 63 can be set, for example, at 45 degrees, and the construction of the beam splitting cube 64 can be simplified as compared with the case wherein the angle of incidence must be set at a small angle of 10 degrees or so as in the conventional construction.

Figure 11A:
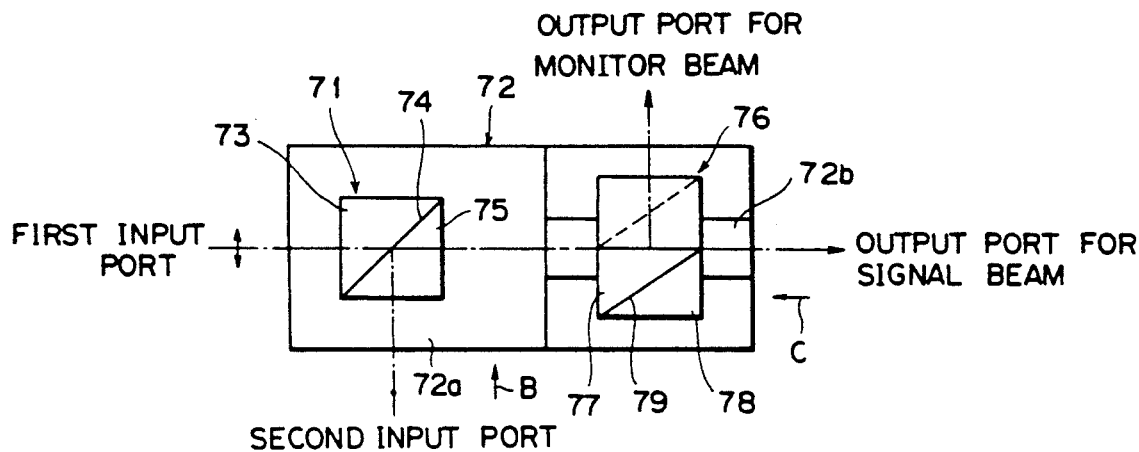
FIG. 11A is a plan view of a polarized beam coupler according to a third embodiment of the present invention.
Figure 11B:
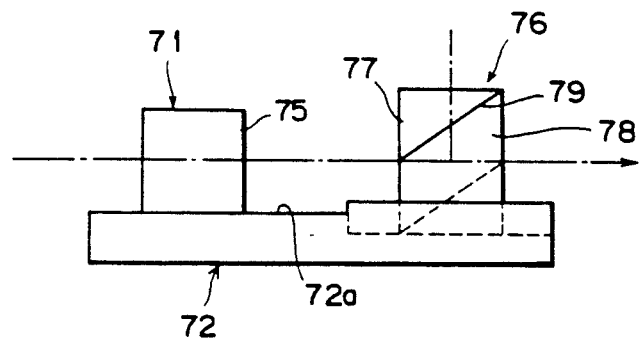
FIG. 11B is a view taken in the direction of the arrow marked B in FIG. 11A.
Figure 11C:
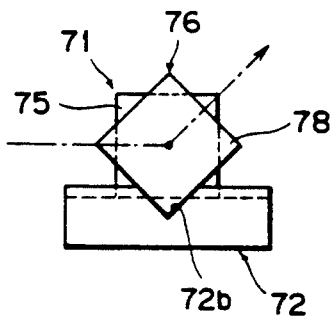
FIG. 11C is a view taken in the direction of the arrow marked C in FIG. 11A.

A third embodiment of the present invention based on the principles described above is described with reference to FIGS. 11A to 11C. FIG. 11A is a plan view of a polarized beam coupler according to the third embodiment of the present invention; FIG. 11B is a view taken in the direction indicated by the arrow marked B in FIG. 11A; and FIG. 11C is a view taken in the direction indicated by another arrow marked C in FIG. 11A.

The polarized beam coupler shown includes a polarized beam coupling cube 71 securely disposed on a flat face 72a of a base plate 72 and composed of a pair of transparent triangular prisms 73 and 75 and a polarized beam coupling film 74 formed, for example, from a dielectric multi-layer or single-layer film and interposed between the triangular prisms 73 and 75. The polarized beam coupler further includes a beam splitting cube 76 placed and secured to a V-shaped groove 72b of the base plate 72. The beam splitting cube 76 is composed of a pair of transparent triangular prisms 77 and 78 and a beam splitting film 79 formed from a dielectric multi-layer or single-layer film and interposed between the triangular prisms 77 and 78.

A light beam from a first input port is adjusted such that the polarization plane thereof is parallel to the plane of incidence of the polarized beam coupling film 74, and the angle of incidence to the film is 45 degrees in the present embodiment. Meanwhile, a light beam from a second input port is adjusted such that the polarization plane thereof is perpendicular to the plane of incidence of the polarized beam coupling film 74, and the angle of incidence again is 45 degrees. Further, the positions of incidence of the individual light beams are set such that the optical paths of the light beam from the first input port transmitted through the polarized beam coupling film 74 and of the light beam from the second input port reflected by the polarized beam coupling film 74 coincide with each other.

In the present embodiment, the beam splitting cube 76 disposed on the optical axis of the polarized beam coupling cube 71 has the same configuration as the polarized beam coupling cube 71, and the plane of incidence to the beam splitting film 79 of the beam splitting cube 76 is at an angle of 45 degrees with respect to each of the polarization planes of the light beam from the first input port and the light beam from the second input port. This is accomplished by locating the beam splitting cube 76 on the optical axis in spaced relationship relative to the polarized beam coupling cube 71 and securing the same at a rotational position of 45 degrees around the optical axis as can be seen in FIG. 11C.

When the polarized beam coupling cube 71 and the beam splitting cube 76 are disposed in such positional relationship, the P wave component and the S wave component with respect to the beam splitting film 79 are equal to each other with regard to both reflectional and transmissional characteristics in beam splitting film 79. Accordingly, the polarization dependency of the splitting ratio of the beam splitting cube 76 is eliminated. In particular, when a light beam from the first input port is received, the ratio between the output power level at the output port for a signal beam provided on the optical path of light transmitted through the beam splitting film 79 and the output power level at the output port for a monitor beam provided on the optical path of light reflected by the beam splitting film 79 coincides with the ratio of transmitted to reflected light when a light beam is received from the second input port. Accordingly, in case a light source which employs a laser diode is doubled using such polarized beam coupler, stable operation before and after changing of the light source is assured. Further, since there is no necessity of setting the angle of incidence to the beam splitting film of the beam splitting cube at a small angle of 10 degrees or so, as in a conventional device, the beam splitting cube can be simplified in construction.

While the embodiments described above utilize a polarized beam coupling cube 71 and a beam splitting cube 76, it is possible to use the polarized beam coupling prism unit and the beam splitting prism unit illustrated in FIGS. 7 and 8 in place of the cubes 71 and 76, respectively.

In the various embodiments described above, the possible dependency of the signal beam output power level or the monitor beam output power level upon the polarization plane of the incident light beam is prevented by eliminating the polarization dependency of the light reflecting and light transmitting characteristics of the beam splitting film. On the other hand, a fourth embodiment of the present invention which will be described hereinafter is constituted such that the polarization dependency of the beam splitting film is utilized positively so that the ratio between the amounts of light in a monitor beam extracted from one incident light beam and in another monitor beam extracted from a second incident light beam may be varied arbitrarily.

Figure 12:
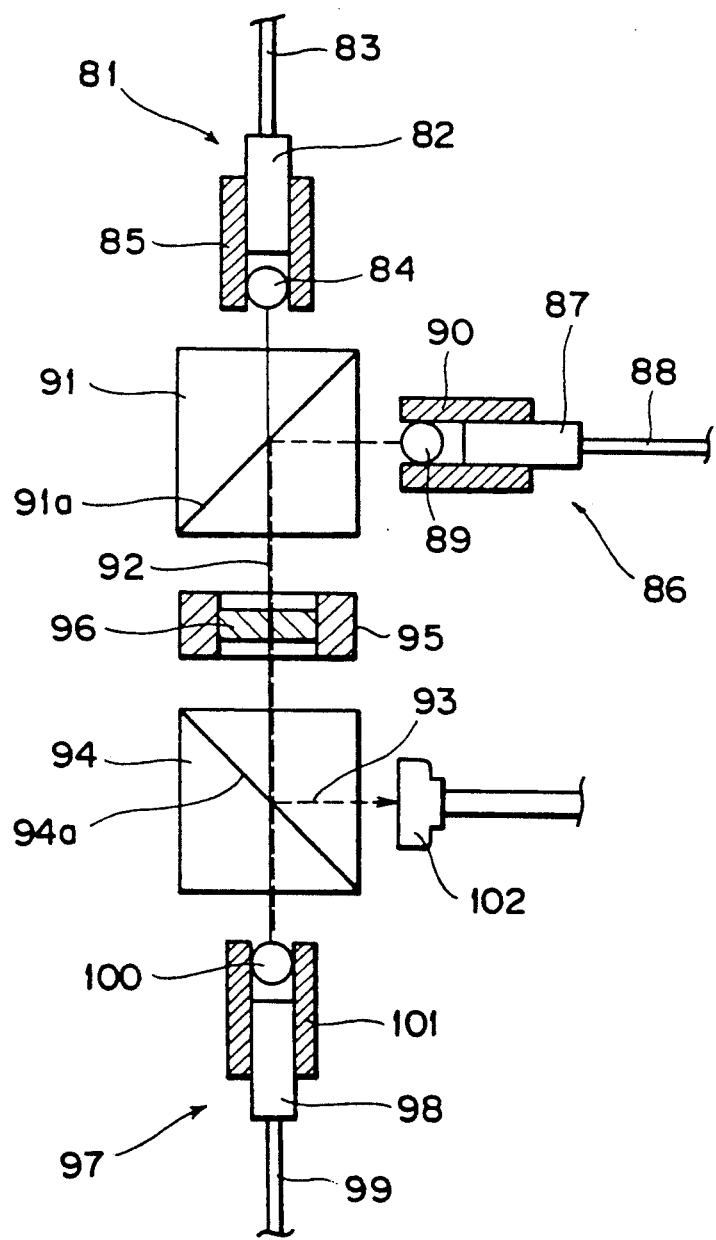
FIG. 12 is a plan view of the polarization beam coupler according to a fourth embodiment of the present invention.

FIG. 12 is a plan view of a polarized beam coupler according to a fourth embodiment of the present invention. The polarized beam coupler shown in FIG. 12 includes a pair of optical fiber assemblies 81 and 86, each of which includes a polarization preserving optical fiber 83 or 88 secured to a ferrule 82 or 87, a collimator lens 84 or 89, and a holder 85 or 90 to which the polarization preserving fiber 83 or 88 and the collimator lens 84 or 89 are secured in a predetermined positional relationship, respectively. The polarized beam coupler further includes a polarization beam coupling cube 91 having a polarized beam coupling film 91a formed from a dielectric multi-layer or single-layer film. The optical fiber assembly 81 is disposed such that the polarization plane of light emerging therefrom makes a P wave with respect to the polarized beam coupling film 91a, that is, the polarization plane of the emergent light is parallel to the plane of incidence to the polarized beam coupling film 91a. On the other hand, the optical fiber assembly 86 is disposed such that the polarization plane of light emerging therefrom makes an S wave with respect to the polarized beam coupling film 91a, that is, the polarization plane of the light is perpendicular to the plane of incidence to the polarized beam coupling film 91a.

The P wave of emergent light from the polarization preserving fiber 83 is first collimated by the lens 84 and then passes through the polarized beam coupling film 91a, while the S wave of emergent light from the polarization preserving fiber 88 is first collimated by the lens 89 and then reflected by the polarized beam coupling film 91a, and the transmitted light beam and the reflected light beam are projected on the same optical axis 92.

Figure 16:
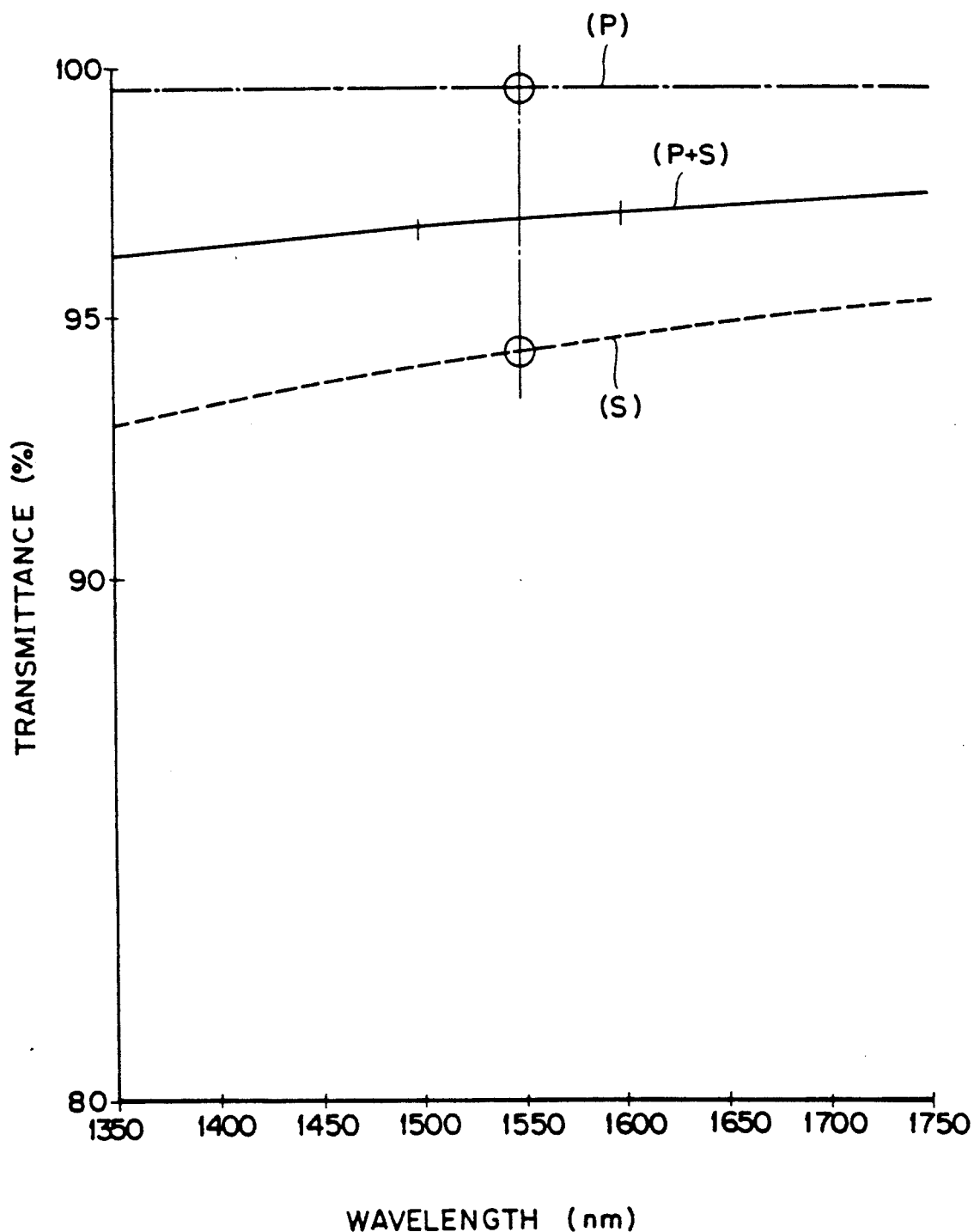
FIG. 16 is a graph illustrating the characteristics of a beam splitting film having polarization dependency.

The polarized beam coupler further includes a beam splitting cube 94 for extracting a monitor beam 93 from the beam emerging from the polarized beam coupling cube 91 and projected on the optical axis 92. The beam splitting cube 94 includes a beam splitting film 94a formed from a dielectric multi-layer or single-layer film. The beam splitting cube 94 has polarization dependency characteristics as shown, for example, in FIG. 16. Referring to FIG. 16, the curve denoted by (P) indicates the characteristics of the P wave having a polarization plane parallel to the plane of incidence to the beam splitting film while the curve denoted by (S) indicates the characteristics of an S wave having a polarization plane perpendicular to the plane of incidence of the beam splitting film. Further, the curve denoted by (P+S) indicates the characteristics of circularly polarized light for reference.

Referring back to FIG. 12, the polarized beam coupler further includes a half-wave plate 96 secured to a rotatable holder 95 and interposed for rotation between the polarized beam coupling cube 91 and the beam splitting cube 94. The polarized beam coupler further includes an optical fiber assembly 97 which is composed of a single mode fiber 99 secured to a ferrule 98, a collimator lens 100, and a holder 101 to which the single mode fiber 99 and the collimator lens 100 are secured in a predetermined positional relationship. The polarized beam coupler further includes a photodiode 102 for receiving a monitor beam.

The polarization planes of light beams coupled by the polarized beam coupling cube 91 and projected on the same optical axis are rotated through a predetermined angle by the half-wave plate 96 and are introduced into the beam splitting cube 94. One of the light beams incident to the beam splitting cube 94 which has passed through the beam splitting film 94a is focused by the lens 100 and introduced into the single mode optical fiber 99 for further transmission. Meanwhile, the other of the light beams incident to the beam splitting cube 94 which has been reflected by the beam splitting film 94a is introduced into the photodiode 102 so that it may be used for monitoring of the output light beam level, feedback control and so forth.

Figure 13:
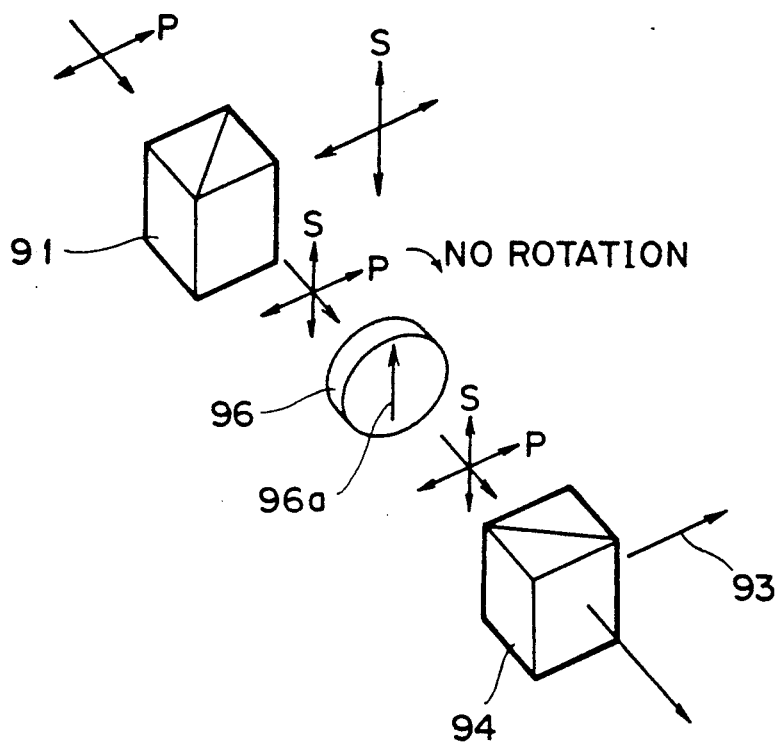
FIG. 13 is a schematic perspective view of the polarized beam coupler of FIG. 12 where the optical axis of a half-wave plate coincides with the polarization plane of an S wave.
Figure 14A:
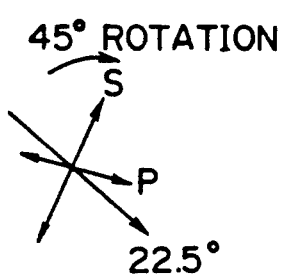
FIGS. 14A and 14B are diagrammatic illustrations showing the rotational angles of polarization planes when the optical axis of the half-wave plate shown in FIG. 13 is rotated 22.5 and 45 degrees, respectively.
Figure 14B:
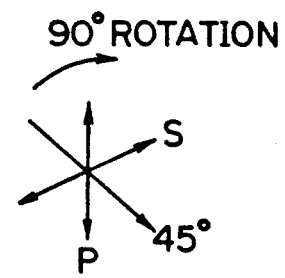

The following is a description of how the polarization plane of a beam of light is rotated by rotating the half-wave plate 96 with reference to FIGS. 13, 14A and 14B. As shown in FIG. 13, where the optical axis 96a of the half-wave plate 96 coincides with the polarization plane of the S wave, a P wave and an S wave of emergent light from the polarized beam coupling cube 91 are introduced into the beam splitting cube 94 without rotation of the polarization planes thereof. It is to be noted that the P wave and the S wave appearing in FIG. 13 are denoted as such with reference to the polarized beam coupling film 91a of the polarized beam coupling cube 91. Where the optical axis 96a of the half-wave plate 96 is rotated 22.5 degrees, a P wave and an S wave of emergent light from the polarized beam coupling cube 91 are introduced into the beam splitting cube 94 after the polarization planes thereof are rotated 45 degrees as shown in FIG. 14A. Where the optical axis 96a of the half-wave plate 96 is rotated 45 degrees, a P wave and an S wave of emergent light from the polarized beam coupling cube 91 are introduced into the beam splitting cube 94 after the polarization planes thereof are rotated 90 degrees as shown in FIG. 14B. In this manner, the polarization planes of a P wave and an S wave of emergent light from the beam splitting cube 91 can be varied freely in accordance with the rotational angle of the half-wave plate 96.

Figure 15:
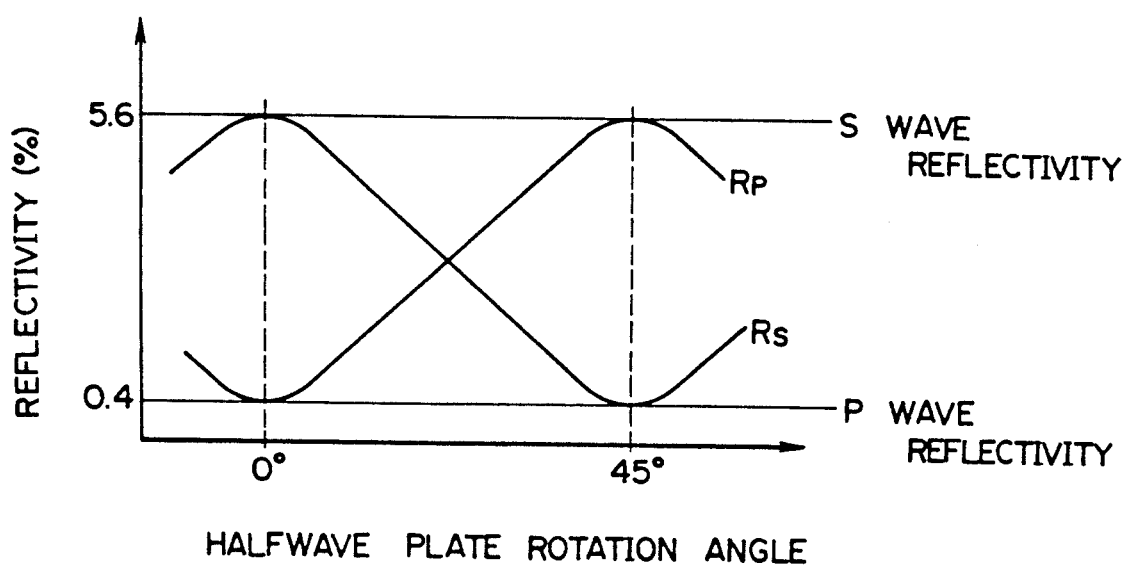
FIG. 15 is a graph illustrating the relationship between rotational angle and reflectivity of the half-wave plate in cases where a beam splitting film having a polarization dependency is used.

FIG. 15 illustrates the relationship between the rotational angle of the half-wave plate and the reflectivity of the beam splitting film. In FIG. 15, the curve $R_p$ shows the relationship between the rotational angle and reflectivity with respect to incident light (P wave) from polarization preserving fiber 83, while the curve $R_s$ shows the relationship between the rotational angle and reflectivity with respect to incident light (S wave) from polarization preserving fiber 88. The characteristics of the beam splitting film used in the polarized beam coupler of the present embodiment are shown in FIG. 16, and it can be seen from FIG. 16 that, where the wave length used is 1,550 nm, the reflectivity for the P wave is 0.4% (transmittance 99.6%) and the reflectivity for the S wave is 5.6% (transmittance 94.4%). From FIG. 15 it can be seen that $R_p$ and $R_s$ vary relatively within the range of 0.4 to 5.6% by rotation of the half-wave plate 96. In this manner, the ratio of the intensities of a monitor beam extracted from the light beam emerging from polarization preserving fiber 83 and of another monitor beam extracted from the light beam emerging from polarization preserving fiber 88 can be changed arbitrarily by rotation of the half-wave plate 96.

As is apparent from FIG. 15, when the half-wave plate 96 is rotated by 22.5 degrees, the reflectivities for P wave and S wave by the beam splitting film 94a become equal to each other, and the output levels of monitor light beams can be maintained at a fixed value irrespective of the polarization planes of incident light beams.

While the polarized beam coupling cube 91 and the beam splitting cube 94 are used in the polarized beam coupler of the fourth embodiment shown in FIG. 12, it is possible to employ the polarized beam coupling prism unit and beam splitting prism unit as shown in FIGS. 7 and 8 in place of the cubes 91 and 94, respectively. Where such prism units are used, two incident light beams can be made to be parallel to each other and the extracting direction of a monitor beam can be made to be parallel to the signal beam.

Further, while the rotatable half-wave plate is employed as a polarization plane rotating means in the polarized beam coupler of the fourth embodiment described above, it is possible to otherwise employ a Faraday rotator by which polarization can be changed arbitrarily in response to a magnetic field applied thereto.

Since various changes and modifications of the invention will occur to and can be readily made by those skilled in the art without departing from the concepts of the invention, the invention is not to be taken as limited except by the scope of the appended claims.

What is claimed is:

1. A polarized beam coupler adapted to produce an output beam for monitoring, comprising:
    a polarized beam coupling means for coupling two incident light beams having planes of polarization that are perpendicular to each other and projecting the coupled light beams on a common optical axis;
    a beam splitting means disposed on the common optical axis of said polarized beam coupling means for extracting a monitor beam, said beam splitting means having a beam splitting film formed from a dielectric film; and
    a quarter-wave plate interposed between said polarized beam coupling means and said beam splitting means such that incident light beams to said beam splitting means are composed of circularly polarized light.

2. A polarization beam coupler according to claim 1, wherein said polarization beam coupling means is a polarization beam coupling cube while said beam splitting means is a beam splitting cube.

3. A polarization beam coupler according to claim 2, wherein said quarter-wave plate is adhered to both of said polarization beam coupling cube and said beam splitting cube by means of an optical bonding agent.

4. A polarization beam coupler according to claim 1, wherein said polarization beam coupling means is a polarization beam coupling prism unit which is composed of a first parallelogram prism and a first triangular prism adhered to said first parallelogram prism with a polarization beam coupling film interposed on an interface therebetween while said beam splitting means is a beam splitting prism unit which is composed of a second parallelogram prism and a second triangular prism adhered to said second parallelogram prism with a beam splitting film interposed on an interface therebetween.

5. A polarized beam coupler according to claim 4, wherein said first and second parallelogram prisms have respective faces that are adhered to a base and respective side faces that extend upwardly from the base, said first and second triangular prisms being adhered to said side faces of said first and second parallelogram prisms, respectively, in a spaced relationship from said base.

6. A polarized beam coupler according to claim 4, wherein one of the incident light beams is introduced into said first triangular prism and the other incident light beam is parallel to said one incident light beam and introduced into said first parallelogram prism, and wherein one emergent light beam is projected from said second triangular prism and another emergent light beam is parallel to said one emergent light beam and projected from said second parallelogram prism.

7. A polarization beam coupler according to claim 4, wherein said quarter-wave plate is adhered to both of said polarization beam coupling prism unit and said beam splitting prism unit by means of an optical bonding agent.

8. A polarization beam coupler according to claim 4, wherein said quarter-wave plate is adhered to either one of said polarization beam coupling prism unit and said beam splitting prism unit by means of an optical bonding agent.

9. A polarized beam coupler adapted to produce an output beam for monitoring, comprising:
    a polarized beam coupling means for coupling two incident light beams having planes of polarization that are perpendicular to each other and projecting the coupled light beams on a common optical axis, said polarized beam coupling means comprising a polarized beam coupling prism unit which includes a first parallelogram prism, a first triangular prism adhered to said first parallelogram prism, and a polarized beam coupling film interposed on the interface between said first prisms;
    a beam splitting means disposed on the common optical axis of said polarized beam coupling means for extracting a monitor beam, said beam splitting means having a beam splitting film formed from a dielectric film having a polarization dependency, said beam splitting means comprising a beam splitting prism unit which includes a second parallelogram prism, a second triangular prism adhered to said second parallelogram prism, and wherein said beam splitting film is interposed on the interface between said second prisms; and
    a polarization plane rotating means disposed between said polarized beam coupling means and said beam splitting means.

10. A polarized beam coupler according to claim 9, wherein one of the incident light beams is introduced into said first triangular prism while the other incident light beam is parallel to said one incident light beam and introduced into said first parallelogram prism, and one emergent light beam is projected from said second triangular prism while another emergent light beam is parallel to said one emergent light beam and projected from said second parallelogram prism.

11. A polarized beam coupler according to claim 9, wherein said first and second parallelogram prisms have respective faces that are adhered to a base and respective side faces that extend upwardly from the base, said first and second triangular prisms being adhered to said side faces of said first and second parallelogram prisms, respectively, in a spaced relationship from said base.

* * * * *

UNITED STATES PATENT AND TRADEMARK OFFICE
CERTIFICATE OF CORRECTION

PATENT NO. : 5,223,975                 Page 1 of 3

DATED     : June 29, 1993

INVENTOR(S) : NORIHISA NAGANUMA, HISASHI TAKAMATSU, KENICHI ABE

It is certified that error appears in the above-identified patent and that said Letters Patent is hereby corrected as shown below:

TITLE PAGE [57] ABSTRACT
    line 1, "polarization" should be --polarized;
    lines 2 and 3, delete "is disclosed. The polarization beam coupler";
    line 3, "polarization" should be --polarized--;
    line 5, insert --that are-- after "planes";
    line 7, "optic axis" should be --optical axis. The coupler also includes--;
    line 9, "beam, and" should be --beam. A--;
    line 10, insert --is-- after "plate", "polarization" should be --polarized--;
    line 11, after "cube" insert --in a disposition--;
    line 12, "may be" should be --are formed of--;
    lines 14 and 15, can be prevented from depending" should be --is not dependent--.

Column 4, line 8, "polarization" should be --polarized--;
    line 39, "polarization" should be --polarized--.

Column 8, line 2, "difference" should be --differences--.

Column 13, line 23, "What is claimed is" should be --We Claim--;
    line 40, "polarization" should be --polarized--;
    line 41, "polarization" should be --polarized--, "is" should be --comprises--;
    line 42, "polarization" should be --polarized--, "while" should be --and--, "is" should be --comprises--;

UNITED STATES PATENT AND TRADEMARK OFFICE
CERTIFICATE OF CORRECTION

PATENT NO.  : 5,223,975
DATED       : June 29, 1993
INVENTOR(S) : NORIHISA NAGANUMA, HISASHI TAKAMATSU, KENICHI ABE It is certified that error appears in the above-identified patent and that said Letters Patent is hereby corrected as shown below:

Column 13, line 44, "polarization" should be --polarized--;
          line 46, "polarization" should be --polarized--;
          line 48, "polarization" should be --polarized--;
          line 49, "polarization" should be --polarized--, "is" should be --comprises--;
          line 50, "polarization" should be --polarized--;
          line 51 and 52, "is composed of" should be --includes--;
          line 52, "prism and" should be --prism,--;
          line 53, "prism with" should be --prism, and--;
          line 54, "polarization" should be --polarized--, "an" should be --the--;
          line 55, "therebetween while" should be --between said first prisms, and--, "is" should be --comprises--;
          line 56, "is composed of" should be --includes--, "prism and" should be --prism,--;
          line 57, "prism and" should be --prism,--;
          line 58, "prism with" should be --prism, and--;
          line 59, "an interface therebetween" should be --the interface between said second prism Column 14, line 12, "polarization" should be --polarized--;
          line 13, delete "both of";
          line 14, "polarization" should be --polarized--, after "and" insert --to--;
          line 17, "polarization" should be --polarized--;

UNITED STATES PATENT AND TRADEMARK OFFICE
CERTIFICATE OF CORRECTION

PATENT NO. : 5,223,975

DATED : June 29, 1993

INVENTOR(S) : NORIHISA NAGANUMA, HISASHI TAKAMATSU, KENICHI ABE

It is certified that error appears in the above-identified patent and that said Letters Patent is hereby corrected as shown below:

Column 14, line 19, "polarization" should be --polarized--, after "and" insert --or--.

Signed and Sealed this

Twenty-sixth Day of April, 1994

*Attest:*

BRUCE LEHMAN

*Attesting Officer*    Commissioner of Patents and Trademarks